United States Patent
Ho (10) Patent No.: US 11,217,405 B2
(45) Date of Patent: Jan. 4, 2022

(54) ILLUMINATED KEYBOARD AND BACKLIGHT MODULE THEREOF

(71) Applicant: Chicony Power Technology Co., Ltd., New Taipei (TW)

(72) Inventor: Hsuan-Wei Ho, New Taipei (TW)

(73) Assignee: CHICONY POWER TECHNOLOGY CO., LTD., New Taipei (TW)

(*) Notice: Subject to any disclaimer, the term of this patent is extended or adjusted under 35 U.S.C. 154(b) by 0 days.

(21) Appl. No.: 16/792,008

(22) Filed: Feb. 14, 2020

(65) Prior Publication Data

US 2021/0082642 A1   Mar. 18, 2021

(30) Foreign Application Priority Data

Sep. 12, 2019  (TW) .................................. 108133123

(51) Int. Cl.
*H01H 13/83* (2006.01)
*H01H 13/705* (2006.01)
*F21V 8/00* (2006.01)

(52) U.S. Cl.
CPC ........... *H01H 13/83* (2013.01); *G02B 6/0031* (2013.01); *H01H 13/705* (2013.01); *H01H 2219/018* (2013.01); *H01H 2219/06* (2013.01)

(58) Field of Classification Search
CPC .............................. H01H 13/83; H01H 13/705
See application file for complete search history.

(56) References Cited

U.S. PATENT DOCUMENTS

| 10,312,035 B2 | 6/2019 | Chiang et al. |
| 10,332,701 B2 | 6/2019 | Yeh et al. |
| 2009/0010005 A1* | 1/2009 | Chang .................. G02B 6/0031 362/309 |
| 2009/0207631 A1* | 8/2009 | Isoda ...................... H01H 13/83 362/619 |
| 2020/0042101 A1* | 2/2020 | Cheng .................. G02B 6/0055 |

FOREIGN PATENT DOCUMENTS

| CN | 102759052 B | 12/2014 |
| TW | M482759 U | 7/2014 |
| TW | 201517096 A | 5/2015 |
| TW | I604492 B | 11/2017 |
| TW | 201812818 A | 4/2018 |
| TW | 201820366 A | 6/2018 |
| TW | 201907428 A | 2/2019 |
| TW | 201909220 A | 3/2019 |

* cited by examiner

*Primary Examiner* — Julie A Bannan
(74) *Attorney, Agent, or Firm* — Innovation Capital Law Group, LLP; Vic Lin (57) ABSTRACT

A backlight module is adapted to an illuminated keyboard. The backlight module includes a light source assembly and a light guide film. The light guide film has a top surface, a bottom surface, a through hole, a light-incident pattern and a light-exit pattern. The light source assembly includes a light-emitting component configured to emit light toward the through hole. A size of the through hole is smaller than a size of the light-emitting component. The light-incident pattern is located on at least one of the top surface and the bottom surface. The light-exit pattern is located on the bottom surface. A distance from the through hole to the light-exit pattern is greater than a distance from the through hole to the light-incident pattern.

10 Claims, 7 Drawing Sheets

ILLUMINATED KEYBOARD AND BACKLIGHT MODULE THEREOF

CROSS-REFERENCE TO RELATED APPLICATION

This non-provisional application claims priority under 35 U.S.C. § 119(a) to Patent Application No. 108133123 filed in Taiwan, R.O.C. on Sep. 12, 2019, the entire contents of which are hereby incorporated by reference.

BACKGROUND

Technical Field

The present invention relates to an illuminated keyboard and a backlight module thereof, and in particular, to an illuminated keyboard with direct backlight and a backlight module thereof.

Related Art

A keyboard is a common input apparatus for an electronic device such as a desktop computer, a notebook computer, a tablet computer and a mobile phone. A desktop computer and a notebook computer are usually equipped with a physical keyboard, and a tablet computer and a mobile phone may be equipped with a virtual keyboard.

When using a physical keyboard, a user sometimes needs to see symbols on keys to press correct keys. However, when using the physical keyboard in a dim or dark environment, the user may fail to locate the correct keys. Therefore, an illuminated keyboard is provided. During use, the illuminated keyboard emits light to illuminate symbols on keys, so that a user can see the symbols and correctly press the desired keys in a dark environment.

SUMMARY

In view of the foregoing, the present invention provides an illuminated keyboard and a backlight module thereof, to illuminate at least one keycap of the keyboard.

According to some embodiments, a backlight module includes a light source assembly and a light guide film. The light source assembly includes a light-emitting component. The light-emitting component is configured to emit light. The light guide film has a top surface, a bottom surface, a through hole, a light-incident pattern and a light-exit pattern. A size of the through hole is smaller than a size of the light-emitting component. The light of the light-emitting component is toward the through hole. The light-incident pattern is on at least one of the top surface and the bottom surface and is adjacent to the through hole. The light-exit pattern is on the bottom surface. A distance from the through hole to the light-exit pattern is greater than a distance from the through hole to the light-incident pattern.

According to some embodiments, the backlight module further includes a reflective sheet. The reflective sheet is above the top surface of the light guide film and corresponds to the through hole.

According to some embodiments, the light-incident pattern is adjacent to the through hole and on both the top surface and the bottom surface.

According to some embodiments, the backlight module further includes a shading ring. The shading ring is above the top surface of the light guide film. The shading ring has an opening. The opening corresponds to the light-exit pattern.

According to some embodiments, the light guide film further has a light-blocking band. The light-blocking band corresponds to the shading ring or the light-exit pattern. The light source assembly further includes a circuit board. The light-emitting component is on the circuit board. The backlight module further includes a light-blocking ring. The light-blocking ring is between the circuit board and the light guide film and corresponds to the light-blocking band.

According to some embodiments, a backlight module includes a light source assembly, a light guide film and a reflective sheet. The light source assembly includes a light-emitting component. The light-emitting component is configured to emit light. The light guide film has a bottom surface, a through hole and a light-exit pattern. A size of the through hole is smaller than a size of the light-emitting component. The light of the light-emitting component is toward the through hole. The light-exit pattern is on the bottom surface. The reflective sheet is above the through hole. A size of the reflective sheet is larger than or equal to the size of the through hole. A distance from the through hole to an outer edge of the light-exit pattern is greater than a distance from to the through hole to an outer edge of the reflective sheet.

According to some embodiments, an illuminated keyboard includes a keyboard assembly and a backlight module. The backlight module is below the keyboard assembly. The backlight module includes a light source assembly and a light guide film. The light source assembly includes a light-emitting component. The light-emitting component is configured to emit light. The light guide film has a top surface, a bottom surface, a through hole, a light-incident pattern and a light-exit pattern. A size of the through hole is smaller than a size of the light-emitting component. The light of the light-emitting component is toward the through hole. The light-incident pattern is on at least one of the top surface and the bottom surface and is adjacent to the through hole. The light-exit pattern is on the bottom surface. A distance from the through hole to the light-exit pattern is greater than a distance from the through hole to the light-incident pattern.

According to some embodiments, the keyboard assembly includes a plurality of keycaps. A central axis of the through hole is toward one of the plurality of keycaps. The light-exit pattern is located near the edge of the keycap. The backlight module further includes a shading ring. The shading ring is between the light guide film and the keyboard assembly. The shading ring has an opening. The opening corresponds to the light-exit pattern.

According to some embodiments, the keyboard assembly includes a plurality of keycaps. A central axis of the through hole is toward a position between two adjacent keycaps of the plurality of keycaps. The light guide film has two light-exit patterns. The two light-exit patterns correspond to the two adjacent keycaps respectively. The backlight module further includes a shading ring. The shading ring is between the light guide film and the keyboard assembly. The shading ring has two openings. The two openings correspond to the two light-exit patterns respectively.

In conclusion, according to some embodiments, in the backlight module, the through hole with a relative small size on the light guide film cooperates with the light-incident pattern or the reflective sheet, so that the light emitted by the light-emitting component can be directed to the keycaps more efficiently, to illuminate the keycaps with higher luminance for a user to see the keycaps.

DETAILED DESCRIPTION

Figure 1:
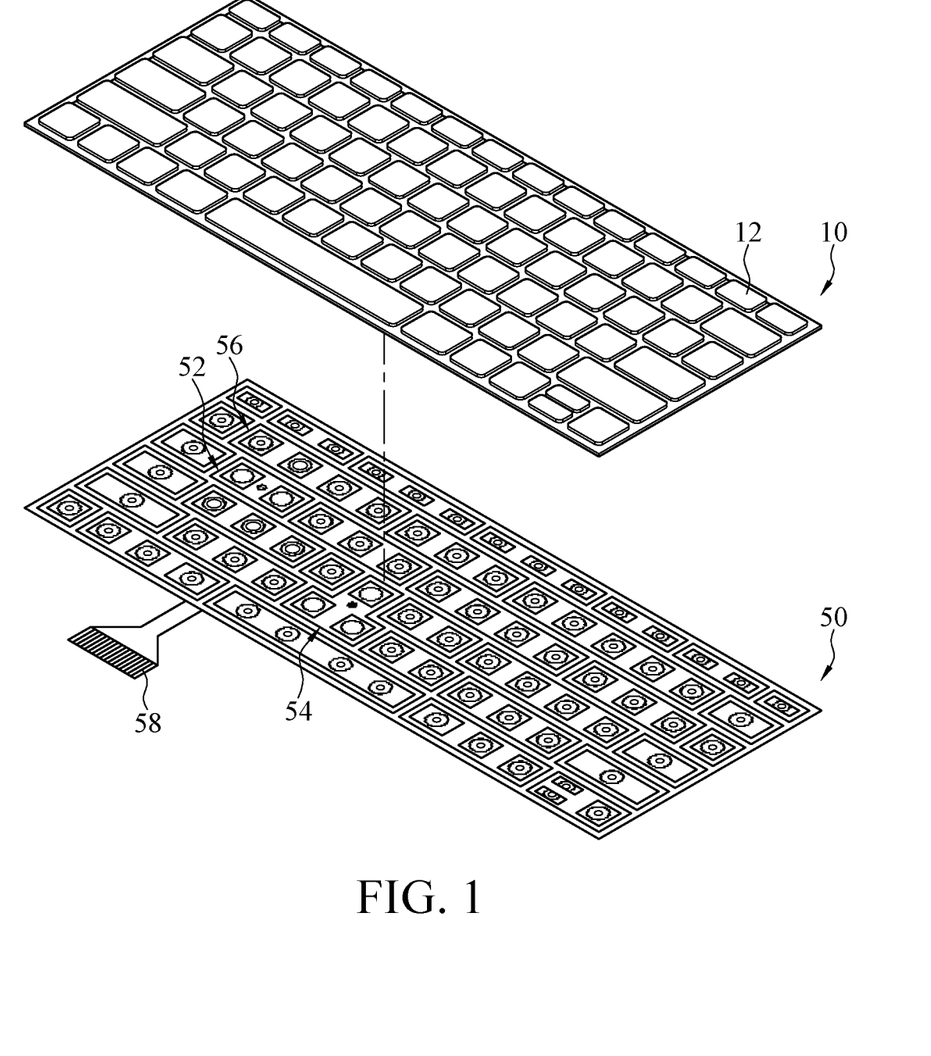
FIG. 1 illustrates a schematic three-dimensional exploded view of an illuminated keyboard according to some embodiments.
Figure 2A:
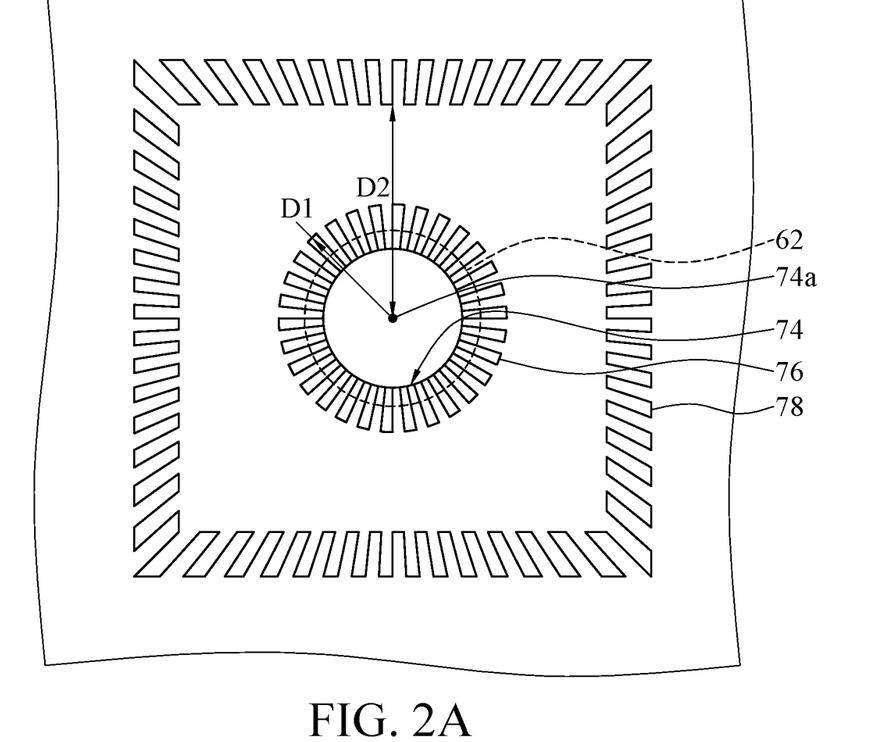
FIG. 2A illustrates a schematic partial top view of a backlight module (omitting a keyboard assembly) corresponding to a single keycap according to some embodiments.
Figure 2B:
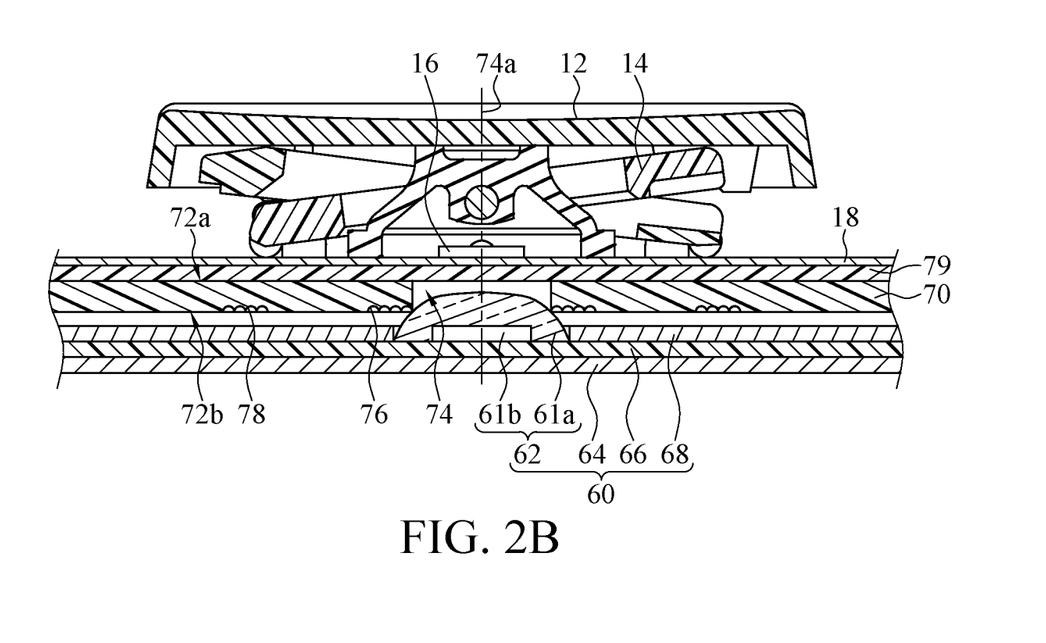
FIG. 2B illustrates a schematic partial sectional view of an illuminated keyboard according to some embodiments.

Refer to FIG. 1, FIG. 2A, and FIG. 2B together. FIG. 1 is a schematic three-dimensional exploded view of an illuminated keyboard according to some embodiments. FIG. 2A is a schematic partial top view of a backlight module (omitting a keyboard assembly) corresponding to a single keycap according to some embodiments. FIG. 2B is a schematic partial (i.e., a part corresponding to a single keycap) sectional view of an illuminated keyboard according to some embodiments. According to some embodiments, an illuminated keyboard includes a keyboard assembly 10 and a backlight module 50. The backlight module 50 is located below the keyboard assembly 10. The backlight module 50 includes a light source assembly 60 and a light guide film 70. The light source assembly 60 includes a light-emitting component 62. The light-emitting component 62 is configured to emit light. The light guide film 70 has a top surface 72a, a bottom surface 72b, a through hole 74, a light-incident pattern 76 and a light-exit pattern 78. A size of the through hole 74 is smaller than a size of the light-emitting component 62. The light of the light-emitting component 62 is toward the through hole 74. The light-incident pattern 76 is located on at least one of the top surface 72a and the bottom surface 72b and is adjacent to the through hole 74 (for example, according to the embodiments shown in FIG. 2A and FIG. 2B, the light-incident pattern 76 is located adjacent to the through hole 74 on the bottom surface 72b. The light-exit pattern 78 is located on the bottom surface 72b. A distance from the through hole 74 to the light-exit pattern 78 is greater than a distance from the through hole 74 to the light-incident pattern 76. In on embodiment, as shown in FIG. 2A and FIG. 2B, the light-incident pattern 76 encloses the through hole 74, and the light-exit pattern 78 encloses the through hole 74.

When the light-emitting component 62 is driven, the light-emitting component 62 emits the light toward the through hole 74. As the size (e.g., the opening area) of the through hole 74 is smaller than the size (e.g., the area from the top view) of the light-emitting component 62, the light irradiates the inner wall of the through hole 74 and the light-incident pattern 76 near the through hole 74 on the top surface 72a and/or the bottom surface 72b of the light guide film 70, so that a relatively large amount of light can directly enter the light guide film 70, and some of the light that enters the light guide film 70 propagates through the way of total inner reflection (in which the light travels inside the light guide film 70 toward the left side and the right side shown in FIG. 2B). When the light that enters the light guide film 70 reaches the light-exit pattern 78, the propagation direction of some of the light is changed by the light-exit pattern 78 to travel toward the top shown in FIG. 2B then passing through the top surface 72a, so as to illuminate a keycap 12. Therefore, in the illuminated keyboard, the keycap 12 with the light-emitting component 62 would have the light emitted from below. In some embodiments, the keycap 12 has at least one symbol. The keycap 12 may be made of a translucent material or the symbol of the keycap 12 has a translucent design. Therefore, the light that passes through the top surface 72a can illuminate the symbol for a user to see it. The symbol may be any symbol required for a keyboard function, and, for example, but not limited to, is an English character, a number or a special symbol.

The keyboard assembly 10 includes a plurality of keycaps 12, a plurality of elastic elements 14, a plurality of switches 16, and a switching circuit 18. The keycaps 12, the elastic elements 14, and the switches 16 are in a one-to-one relationship. The switch 16 is electrically connected to the switching circuit 18. The elastic element 14 normally maintains a thrust to keep the keycap 12 at a position shown in FIG. 2B. When the user presses the keycap 12, the switch 16 is pressed by the bottom of the keycap 12. The switching circuit 18 outputs a signal corresponding to the keycap 12 when detecting that the switch 16 is pressed. When the user releases the keycap 12, the elastic element 14 pushes the keycap 12 back to the position shown in FIG. 2B. In some embodiments, the elastic element 14 has a scissor mechanism. However, the present invention is not limited thereto. In some other embodiments, the elastic element 14 may have a dome mechanism, a pillar mechanism, a butterfly mechanism or the like.

The light source assembly 60 of the backlight module 50 has a flat cable 58 (as shown in FIG. 1) for electrical connection to an external device. The external device is, for example, but not limited to, a computer control system (not shown in the drawings). The computer control system may control whether the light-emitting component 62 of the light source assembly 60 emits light or not. The light guide film 70 is configured to direct the light emitted by the light source assembly 60 to irradiate the keycap 12, so that the user can clearly see the symbol on the keycap 12 in a dim environment. In some embodiments, the light guide film 70 may be divided into a plurality of key group areas 52, 54, 56, and each key group area 52, 54, 56 corresponds to one or more keycaps 12. The key group area 52 of the backlight module 50 in FIG. 1 corresponds to two keycaps 12. The key group area 54 corresponds to three keycaps 12. The key group area 56 corresponds to four keycaps 12.

Figure 2C:
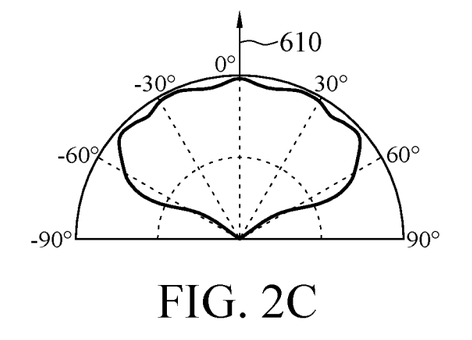
FIG. 2C illustrates a schematic diagram showing the distribution of intensity of light emitted by a light-emitting component of a light source assembly changing with a spatial angle according to some embodiments.

The light-emitting component 62 is configured to emit light. Refer to FIG. 2C. FIG. 2C is a schematic diagram showing the distribution of intensity of light (light-field intensity distribution) emitted by a light-emitting component of a light source assembly changing with a spatial angle according to some embodiments. As shown in FIG. 2C, the light emitted by the light-emitting component is mainly concentrated in an area between spatial angles of plus 60° and minus 60° with respect to a main optical axis 610. The intensity of light is relatively high in the directions of plus 30°, minus 30°, and 0°. In some embodiments, the light-emitting component 62 includes a light emitting chip 61b and a lens 61a shown in FIG. 2B. The light emitting chip 61b may be, but not limited to, a light emitting diode (LED). The lens 61a is configured to adjust the pattern of light emitted by the light emitting chip 61b, so that the pattern is more suitable for a light guide design of the light guide film 70. For example, the pattern is a distribution diagram of the intensity of light changing with a spatial angle when the light emitting chip 61b emits light. In some embodiments, a plurality of light-emitting components 62 of the light source assembly 60 emits light of the same color. In some embodiments, at least two of the plurality of light-emitting components 62 of the light source assembly 60 emit light of different colors.

Referring to FIG. 2A and FIG. 2B, when the size of the through hole 74 is smaller than the size of the light-emitting component 62, it means that the size (i.e., the opening area) of the through hole 74 shown in the top view 2A is smaller than the size (i.e., the extension area except the height) of the light-emitting component 62 shown in the top view 2A, so that the light-emitting component 62 is not completely accommodated in the through hole 74. That is, the light-emitting component 62 is located below the through hole 74. In the embodiment shown in FIG. 2A, both the through hole 74 and the light-emitting component 62 are circular as seen in the top view. In addition, as can be seen from the top view, the diameter of the through hole 74 is less than the diameter of the light-emitting component 62. In some embodiments, a shape of the through hole 74 as seen in the top view is a circle, and a shape of the light-emitting component 62 as seen in the top view is a rectangle. In this case, a diameter of the through hole 74 is less than a length of the diagonal of the rectangle of the light-emitting component 62.

The light of the light-emitting component 62 propagates toward the through hole 74. For example, the main optical axis 610 (as shown in FIG. 2C) of the light-emitting component 62 is toward the through hole 74. In some embodiments, the main optical axis 610 of the light-emitting component 62 is parallel to a central axis 74a of the through hole 74 or is at an acute angle with respect to the central axis 74a of the through hole 74. In some embodiments, the main optical axis 610 of the light-emitting component 62 passes through the through hole 74. That is, the main optical axis 610 of the light-emitting component 62 does not intersect with the hole wall of the through hole 74. In this case, in the foregoing embodiments, the light emitted by the light-emitting component 62 can propagates toward the through hole 74, so that the light enters the light guide film 70 adequately.

The foregoing light-incident pattern 76 is located on the top surface 72a or the bottom surface 72b of the light guide film 70. In the embodiment shown in FIG. 2B, the light-incident pattern 76 is located adjacent to the through hole 74 on the bottom surface 72b. FIG. 2B shows that the inner edge of the light-incident pattern 76 approximately contacts the through hole 74. As shown in FIG. 2A, the light-incident pattern 76 surrounds the through hole 74, so that the light from the light-emitting component 62 enters the light guide film 70 from the inner circumferential surface of the through hole 74. That is, the light may be refracted by the light-incident pattern 76, and then enters the light guide film 70 to be transmitted through the way of total inner reflection.

Figure 3A:
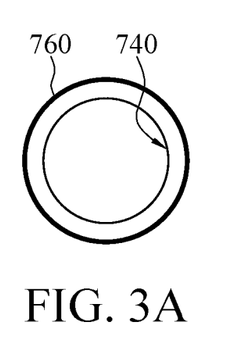
FIG. 3A to FIG. 3D illustrate schematic structural top views of a through hole and a light-incident pattern of a light guide film according to some embodiments.
Figure 3B:
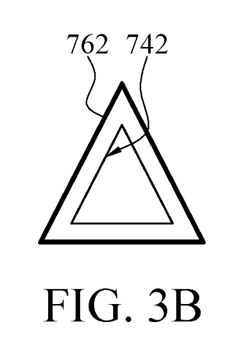
Figure 3C:
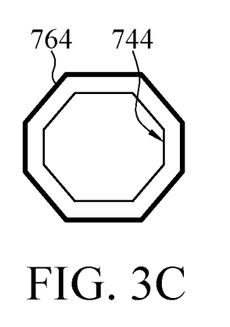
Figure 3D:
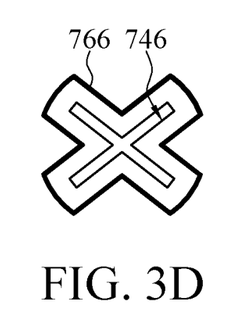

Other embodiments of the through hole 74 and the light-incident pattern 76 are, for example, but not limited to, those shown in FIG. 3A to FIG. 3D. FIG. 3A to FIG. 3D are schematic structural top views of a through hole and a light-incident pattern of a light guide film according to some embodiments. The inner edge of a light-incident pattern 760 shown in FIG. 3A is near but not contacting a through hole 740. A through hole 742 shown in FIG. 3B is triangular when viewed from the top, and a light-incident pattern 762 shown in FIG. 3B is also triangular when viewed from the top. A through hole 744 and a light-incident pattern 764 shown in FIG. 3C are both octagonal when viewed from the top. A through hole 746 and a light-incident pattern 766 shown in FIG. 3D are both X-shaped when viewed from the top.

Referring to FIG. 2A and FIG. 2B, the light-exit pattern 78 is located on the bottom surface 72b. A distance from the through hole 74 to the light-exit pattern 78 is greater than a distance from the through hole 74 to the light-incident pattern 76. For example, in the top view of FIG. 2A, the light-exit pattern 78 is located at the periphery of the light-incident pattern 76. A distance between the central axis 74a of the through hole 74 in the top view of FIG. 2A and an intersection point formed by a (imaginary) straight line that starts from the central axis 74a and extends in the radial direction crossing the outer edge of the light-incident pattern 76 is defined as a first distance D1. In some embodiments, the first distance D1 is the longest distance between the central axis 74a and the intersection point of the straight line and the outer edge of the light-incident pattern 76. A distance between the central axis 74a and an intersection point formed by the straight line crossing the inner edge of the light-exit pattern 78 is defined as a second distance D2. In some embodiments, the second distance D2 is the shortest distance between the central axis 74a and the intersection point of the straight line and the inner edge of the light-exit pattern 78. The second distance D2 is greater than the first distance D1. In some embodiments, an area encircled by the outer edge of the light-exit pattern 78 as seen in the top view (for example, FIG. 2A) is not greater than a vertically-projected area from the keycap 12 onto the light guide film 70 (which means that the keycap 12 fully covers the light-exit pattern 78, as shown in FIG. 2B). In some embodiments, the light-exit pattern 78 is located near the edge of the keycap 12. In the embodiment shown in FIG. 2B, the central axis 74a of the through hole 74 is approximately aligned with a geometric center line of the keycap 12, so that the light that passes through the through hole 74 may directly irradiate the keycap 12.

In the embodiment shown in FIG. 2B, a cross section of each single unit (e.g., optical dot) within the light-incident pattern 76 and the light-exit pattern 78 (also known as microstructures, mesh-dot portions, or light-dot portions) is semicircular. However, the present invention is not limited thereto. The cross section may be any shape, such as an irregular shape, a cone, a square, a triangle, and a trapezoid. In the embodiment shown in FIG. 2B, the light-incident pattern 76 and the light-exit pattern 78 do not protrude from the bottom surface 72b, but are recessed toward the inside of the light guide film 70 (concave dots). In some other embodiments, the light-incident pattern 76 and the light-exit pattern 78 may protrude out from the bottom surface 72b (convex dots). The shapes and the sizes of the light-incident pattern 76 and the light-exit pattern 78, and the distances between adjacent concave or/and convex dots of the light-incident pattern 76 and the light-exit pattern 78 may be adjusted according to the pattern of the light emitted by the light-emitting component 62, the shape of the through hole 74 from its top view, the material of the light guide film 70, the surface roughness of the light guide film 70, and the like. Preferred design solutions may be obtained through the foregoing adjustment by finite experiments. In addition, in some embodiments, the light-incident pattern 76 and the light-exit pattern 78 may also be formed by printed ink on the top surface 72a or the bottom surface 72b of the light guide film 70.

In some embodiments, the backlight module 50 further includes a protection plate 79 (as shown in FIG. 2B) located between the light guide film 70 and the keyboard assembly 10 to protect the light guide film 70. The protection plate 79 is a transparent film for the light of the light-emitting component 62 to pass through. In the embodiment shown in FIG. 2B, after passing through the through hole 74, the light emitted from the light-emitting component 62 can directly travel through the protection plate 79 to illuminate the keycap 12.

The light source assembly 60 further includes a substrate 64, a circuit layer 66 and a reflective layer 68. The light-emitting component 62 is electrically connected to the circuit layer 66. The circuit layer 66 is electrically connected to the flat cable 58 (see FIG. 1). Therefore, the external device may control the light-emitting component 62, through the flat cable 58 and the circuit layer 66, to emit light. The reflective layer 68 is configured to reflect the light from the light-emitting component 62 and the light leaked from the bottom surface 72b of the light guide film 70, so as to increase an amount of light that enters and reenters the light guide film 70 for total inner reflection. In some embodiments, the circuit layer 66 and the reflective layer 68 are separately printed on the substrate 64. In some embodiments, the circuit layer 66 and the reflective layer 68 are separately attached on the substrate 64. In some embodiments, the circuit layer 66 and the reflective layer 68 are respectively printed and attached on the substrate 64. The substrate 64 and the circuit layer 66 may be referred to as a circuit board. The circuit board may be, but not limited to, a flexible printed circuit board (FPCB).

Figure 4A:
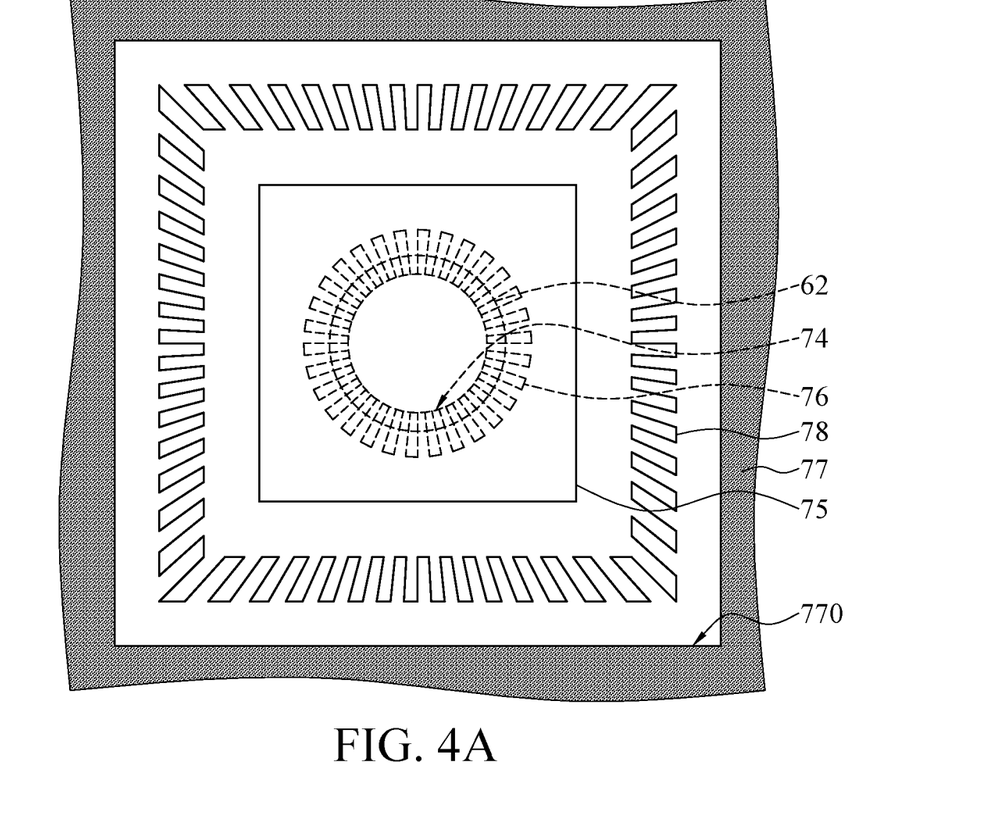
FIG. 4A illustrates a schematic partial top view of a backlight module (omitting a keyboard assembly) corresponding to a single keycap according to some embodiments.
Figure 4B:
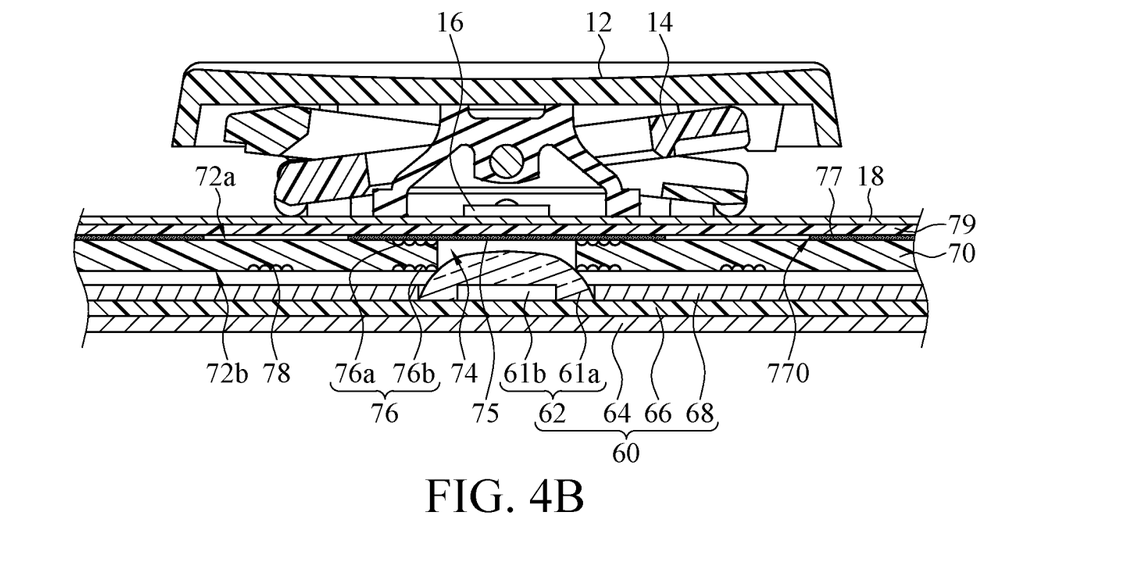
FIG. 4B illustrates a schematic partial sectional view of an illuminated keyboard according to some embodiments.

Refer to FIG. 4A and FIG. 4B. FIG. 4A is a schematic partial top view of a backlight module (omitting a keyboard assembly) corresponding to a single keycap according to some embodiments. FIG. 4B is a schematic partial sectional view of an illuminated keyboard according to some embodiments. In embodiments shown in FIG. 4A and FIG. 4B, the light-incident pattern 76 of the light guide film 70 includes an upper light-incident pattern 76a located on the top surface 72a and a lower light-incident pattern 76b located on the bottom surface 72b. By appropriately adjusting the designs of the upper light-incident pattern 76a and the lower light-incident pattern 76b (for example, by adjusting the arrangement positions, the arrangement patterns or the layout densities of the upper light-incident pattern 76a and the lower light-incident pattern), the amount of the light that enters the light guide film 70 and is transmitted through total inner reflection may be increased. In on embodiment, as shown in FIG. 4A and FIG. 4B, the light-incident pattern 76 encloses the through hole 74, and the light-exit pattern 78 encloses the through hole 74.

In some embodiments, the backlight module 50 further includes a reflective sheet 75. The reflective sheet 75 is located between the light guide film 70 and the keyboard assembly 10, and corresponds to the through hole 74. In the embodiment shown in FIG. 4B, the reflective sheet 75 is rectangular as seen in a top view (for example, the top view 4A). A size of the reflective sheet 75 is larger than the size of the through hole 74. The reflective sheet 75 completely covers the through hole 74. Therefore, the light-emitting component 62 emits the light upward to the reflective sheet 75, and the light is reflected by the reflective sheet 75, so as to effectively enhance a possibility that the light is reflected only once to enter the light guide film 70. In this case, more light may enter the light guide film 70 with almost no loss of energy, and is transmitted through total inner reflection inside the light guide film 70. The light then changes its propagation direction by reaching the light-exit pattern 78, and is emitted from the light guide film 70 toward the location of the keycap 12. In some embodiments, the size of the reflective sheet 75 seen in the top view can be smaller than or equal to the size of the through hole 74. That is, the reflective sheet 75 may cover the through hole 74 incompletely. In some embodiments, the reflective sheet 75 is a reflective film, and is printed or bonded on the light guide film 70. In some embodiments, the reflective sheet 75 is a reflective film, and is printed or bonded on the protection plate 79.

In some embodiments, the backlight module 50 further includes a shading ring 77. The shading ring 77 is located between the light guide film 70 and the keyboard assembly 10. The shading ring 77 has an opening 770. The opening 770 corresponds to the light-exit pattern 78. Therefore, the light directed upward due to the light-exit pattern 78 may pass through the opening 770 to irradiate the keycap 12. In some embodiments, the light-exit pattern 78 and the shading ring 77 overlap partially (while seen from a top view similar to the viewpoint of FIG. 4A). In some embodiments, as shown in FIG. 4B, if seen from a top view (similar to the viewpoint of FIG. 4A), an inner edge of the shading ring 77 is located inside the outer edge of the keycap 12. Therefore, the light that passes through the opening 770 and is emitted toward the keycap 12 is prevented from being leaked through a gap between the keycap 12 and another adjacent keycap 12 to dazzle a user. In some embodiments, the shading ring 77 is a shading film, and is printed or bonded on the light guide film 70. In some embodiments, the shading ring 77 is a shading film, and is printed or bonded on the protection plate 79.

Figure 5:
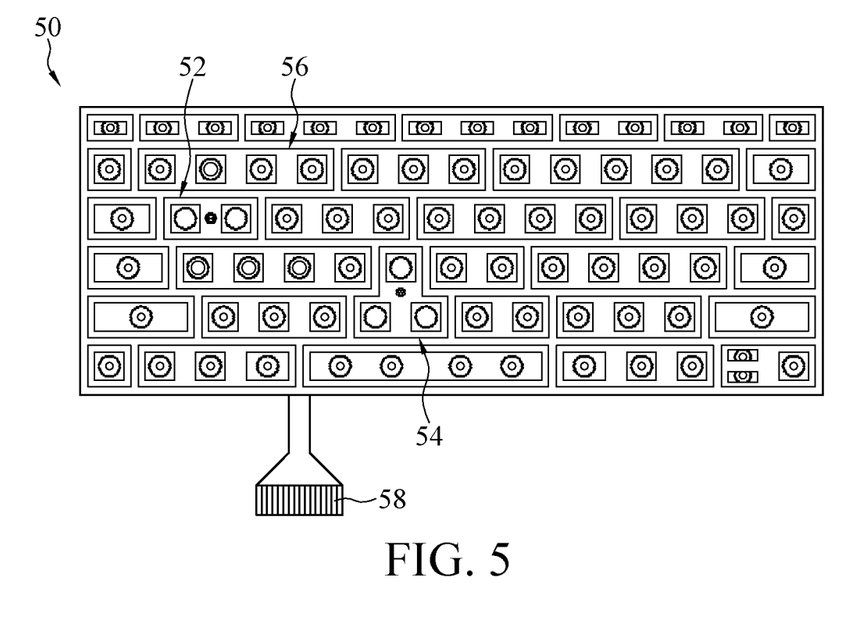
FIG. 5 illustrates a schematic top view of a backlight module according to some embodiments.
Figure 6A:
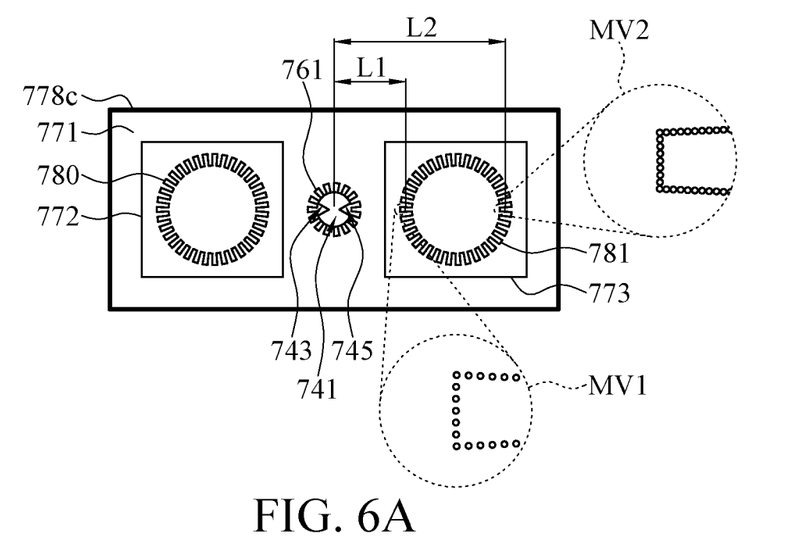
FIG. 6A illustrates a schematic top view of a portion of the backlight module showing a key group area corresponding to two keycaps according to some embodiments.

Further refer to FIG. 5 and FIG. 6A. FIG. 5 is a schematic top view of a backlight module according to some embodiments. FIG. 6A is a schematic top view of a key group area on the light guide film corresponding to two keycaps according to some embodiments. In this embodiment, the key group area 52 corresponds to two keycaps 12 (see FIG. 1). The through hole 741 is located between the two keycaps 12 (while seen in a top view). Specifically, the central axis of the through hole 741 is toward a position between the two adjacent keycaps 12. In some embodiments, the central axis of the through hole 741 is toward the central position between the two adjacent keycaps 12. The light guide film 70 has two light-exit patterns 780, 781. The two light-exit patterns 780, 781 correspond to the two keycaps 12, respectively. The backlight module 50 further includes a shading ring 771. The shading ring 771 is located between the light guide film 70 and the keyboard assembly 10. The shading ring 771 has two openings 772, 773. The two openings 772, 773 correspond to the two light-exit patterns 780, 781, respectively. In this embodiment, a light-incident pattern 761 of the light guide film 70 surrounds the through hole 741. The shape of the through hole 741 as seen in the top view (i.e., FIG. 6A) is approximately a circle. The through hole 741 has two light-collecting corners 743, 745 at positions toward the two light-exit patterns 780, 781, respectively. In some embodiments, opening angles of the light-collecting corners 743, 745 are acute angles. The light-collecting corners 743, 745 enable a relatively large amount of light to be refracted to converge and travel toward the two light-exit patterns 780, 781 (compared with the through hole 74 shown in FIG. 2A whose shape is a complete circle). In some embodiments, a layout density of microstructural units (or convex dots, concave dots, mesh dots, light dots, etc.) of a part of the light-exit patterns 780, 781 which is farther from the through hole 741 is higher than that of another part of the light-exit patterns 780, 781 which is nearer to the through hole 741. In more detail, refer to FIG. 6A. FIG. 6A illustrates a first partial enlarged view MV1 and a second partial enlarged view MV2 of the light-exit pattern 781. A distance from the position on the light-exit pattern 781 which is enlarged in the first partial enlarged view MV1 to the center of the through hole 741 is a first distance L1. A distance from the position on the light-exit pattern 781 which is enlarged in the second partial enlarged view MV2 to the center of the through hole 741 is a second distance L2. The second distance L2 is greater than the first distance L1. A layout density of the microstructural units of the light-exit pattern 781 shown in the first partial enlarged view MV1 is lower than that shown in the second partial enlarged view MV2, thereby achieving overall uniform luminance when the light is directed by the light-exit pattern 781 upward to the keycap 12.

Figure 6B:
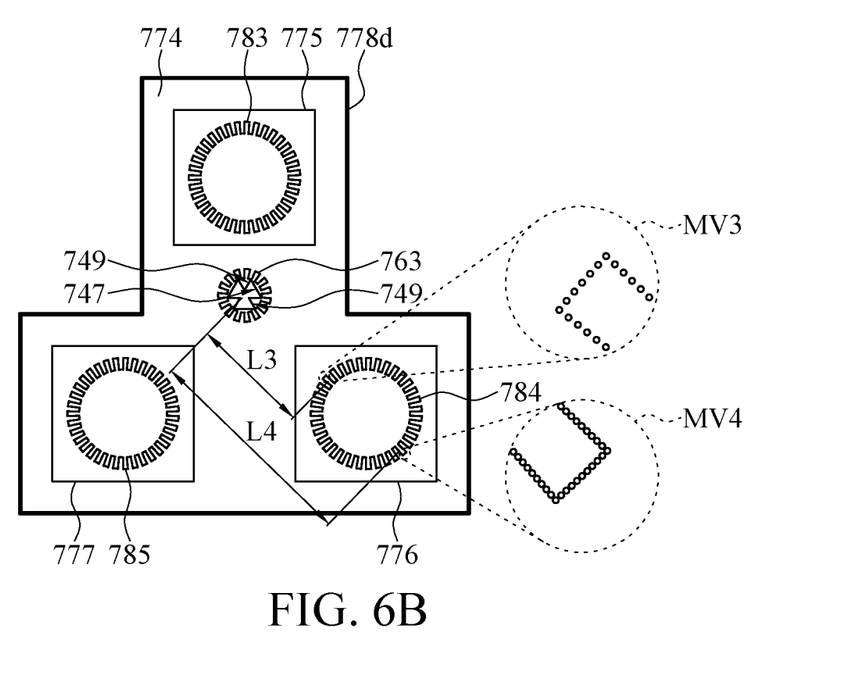
FIG. 6B illustrates a schematic top view of a portion of the backlight module showing a key group area corresponding to three keycaps according to some embodiments.

Further refer to FIG. 5 and FIG. 6B. FIG. 6B is a schematic top view of a key group area on the light guide film corresponding to three keycaps according to some embodiments. In this embodiment, a key group area 54 corresponds to three keycaps 12 (see FIG. 1). The through hole 747 is located among the three keycaps 12 (while seen in a top view). Specifically, a central axis of the through hole 747 is toward a position among the three adjacent keycaps 12. In some embodiments, the central axis of the through hole 747 is toward the central position between the three adjacent keycaps 12. The light guide film 70 has three light-exit patterns 783, 784, 785. The three light-exit patterns 783, 784, 785 correspond to the three keycaps 12, respectively. The backlight module 50 further includes a shading ring 774. The shading ring 774 is located between the light guide film 70 and the keyboard assembly 10. The shading ring 774 has three openings 775, 776, 777. The three openings 775, 776, 777 correspond to the three light-exit patterns 783, 784, 785, respectively. In this embodiment, a light-incident pattern 763 of the light guide film 70 surrounds the through hole 747. The shape of the through hole 747 as seem in the top view (i.e., FIG. 6B) is a polygon with three light-collecting corners 749. Openings of the three light-collecting corners 749 are toward the three light-exit patterns 783, 784, 785, respectively. In some embodiments, an opening angle of the light-collecting corner 749 is an acute angle. The three light-collecting corners 749 enable a relatively large amount of light to be refracted to converge and respectively travel toward the three light-exit patterns 783, 784, 785 (compared with a hexagonal through hole without a light-collecting corner 749).

As can be seen from the foregoing embodiments, each of the key group areas 52 and 54 is provided with one through hole 741, 747 and one light-emitting component 62. However, a key group area 56 (see FIG. 1 and FIG. 5) is provided with four through holes 74 and four light-emitting components 62. Therefore, the configuration of a quantity of through holes and a quantity of light-emitting components related to one specific key group area may be adjusted according to a specific design requirement of keyboard functions.

FIG. 6B shows a third partial enlarged view MV3 and a fourth partial enlarged view MV4 of the light-exit pattern 784. A distance from the position on the light-exit pattern 784 which is enlarged in the third partial enlarged view MV3 to the center of the through hole 747 is a third distance L3. A distance from the position on the light-exit pattern 784 which is enlarged in the fourth partial enlarged view MV4 to the center of the through hole 747 is a fourth distance L4. The fourth distance L4 is greater than the third distance L3. A layout density of the microstructural units of the light-exit pattern 784 shown in the third partial enlarged view MV3 is lower than that shown in the fourth partial enlarged view MV4, thereby achieving overall uniform luminance when the light is directed by the light-exit pattern 784 upward to the keycap 12.

Figure 7A:
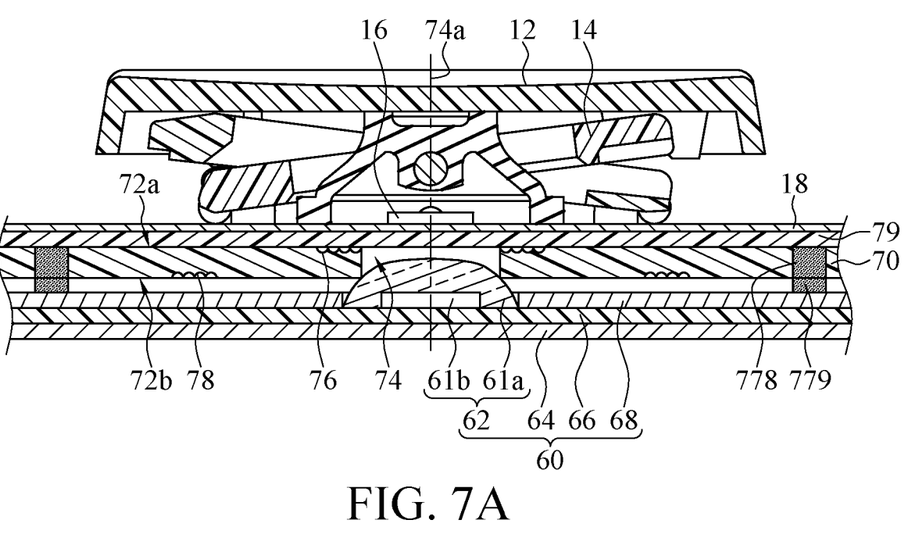
FIG. 7A illustrates a schematic partial sectional view of an illuminated keyboard according to some embodiments.
Figure 7B:
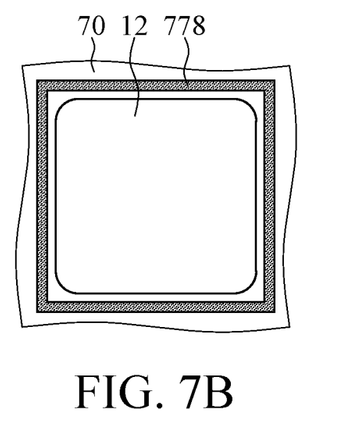
FIG. 7B and FIG. 7C illustrate schematic partial top views of a keycap and a light guide film according to some embodiments.

Refer to both FIG. 7A and FIG. 7B. FIG. 7A is a schematic partial sectional view of an illuminated keyboard according to some embodiments. FIG. 7B is a schematic partial top view of a keycap and a light guide film according to some embodiments. In some embodiments, the light guide film 70 further has a light-blocking band 778. As can be seen from FIG. 7B, the light-blocking band 778 is a closed ring and is located on the outside of the keycap 12 (while seen in the top view), to prevent light corresponding to the through hole 74 from reaching the outside of the light-blocking band 778, and to restrict an effective transmission range of the light that enters the light guide film 70 from the through hole 74. In some embodiments, the light-blocking band 778 is a blackening band that may be formed by irradiating a specific area on the light guide film 70 through a laser. In some embodiments, the backlight module 50 further includes a light-blocking ring 779. The light-blocking ring 779 is located between the light guide film 70 and the reflective layer 68 above a circuit board (e.g., a circuit-functioning board consisting of the substrate 64 and the circuit layer 66 shown in FIG. 7A) and corresponds to the light-blocking band 778. The shape of the light-blocking ring 779 seen in the top view is the same as that of the light-blocking band 778 shown in FIG. 7B. The light-blocking ring 779 is configured to prevent the light emitted by the light-emitting component 62 from leaking out the light-blocking ring 779, and to restrict an effective illumination area of the light-emitting component 62. In some embodiments, for example referring to FIGS. 7A and 7B, the light-blocking band 778 corresponds to the light-exit pattern 78, and the light-blocking ring 779 corresponds to the light-blocking band 778. In some embodiments, the light-blocking ring 779 and the light-blocking band 778 surround the light-exit pattern 78 while seen in a top view. In the embodiment shown in FIG. 7A, a light-incident pattern 76 of the light guide film 70 is located on the top surface 72a only. However, the present invention is not limited thereto.

Refer to both FIG. 6A and FIG. 6B. In some embodiments, an area surrounded by a light-blocking band 778 may correspond to a range of the key group area 52, 54, or 56 distinctively. For example, in the embodiment shown in FIG. 6A, a light-blocking band 778c is located on the light guide film 70 and surrounds the outer edge of the shading ring 771. In this embodiment, the external contour of the light-blocking band 778c is rectangular. Further, in the embodiment shown in FIG. 6B, a light-blocking band 778d is located on the light guide film 70 and surrounds the outer edge of the shading ring 774. In this embodiment, the external contour of the light-blocking band 778d is T-shaped. In some embodiments, a light-emitting component 62 in an area surrounded by the light-blocking band 778, 778a, 778c, or 778d (see FIG. 7B, FIG. 7C, FIG. 6A, and FIG. 6B, respectively) and a light-emitting component 62 outside the area surrounded by the light-blocking band 778, 778a, 778c, or 778d emit light of different colors. Through the configuration of the light-blocking band 778, 778a, 778c, or 778d, a specific color of the light used in the key group area 52, 54, or 56 may be prevented from leaking to other keycaps which are outside the key group area 52, 54, or 56, so as to prevent the undesired color mixing of the light.

Figure 7C:
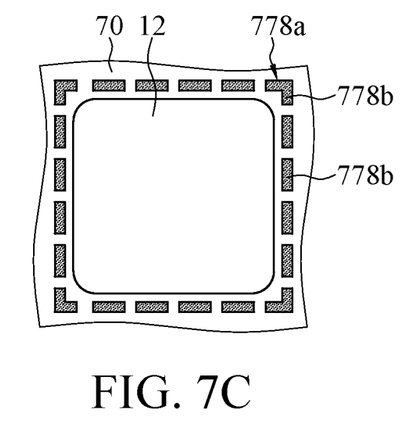

FIG. 7C is a schematic partial top view of a keycap and a light guide film according to some embodiments. In the embodiment shown in FIG. 7C, the light-blocking band 778a includes a plurality of light-blocking gap segments. The light-blocking gap segments cooperate with each other to form a non-closed rectangular ring. Each light-blocking gap segment is a slit pierced through the light guide film 70. Therefore, the light is forced to be refracted and reflected when passing through the light-blocking gap segments, so as to reduce the light that leaks out an area surrounded by the light-blocking band 778a. In some embodiments, the light-blocking gap segments are respectively filled with light-blocking strips 778b which are used to more effectively prevent the light from leaking out the area surrounded by the light-blocking band 778a. In some embodiments, a plurality of light-blocking strips 778b corresponding to the light-blocking gap segments are disposed on one side of the light-blocking ring 779 which faces the light guide film 70, and seamlessly fill the aforementioned light-blocking gap segments.

Refer to FIG. 4A and FIG. 4B. According to some embodiments, a backlight module 50 includes a light source assembly 60 and a light guide film 70. The light source assembly 60 includes a light-emitting component 62. The light-emitting component 62 is configured to emit light. The light guide film 70 has a top surface 72a, a bottom surface 72b, a through hole 74, a light-incident pattern 76 and a light-exit pattern 78. A size of the through hole 74 is smaller than a size of the light-emitting component 62. The light of the light-emitting component 62 is propagated toward the through hole 74. The light-incident pattern 76 is located on at least one of the top surface 72a and the bottom surface 72b, and is adjacent to the through hole 74 (according to the embodiment shown in FIG. 4B, the light-incident pattern 76 is on both the top surface 72a and the bottom surface 72b). The light-exit pattern 78 is located on the bottom surface 72b. A distance from the through hole 74 to the light-exit pattern 78 is greater than a distance from the through hole 74 to the light-incident pattern 76.

In some embodiments, the backlight module 50 further includes a reflective sheet 75. The reflective sheet 75 is located above the top surface 72a of the light guide film 70 and corresponds to the through hole 74. In some embodiments, the backlight module 50 further includes a shading ring 77. The shading ring 77 is located above the top surface 72a of the light guide film 70. The shading ring 77 has an opening 770. The opening 770 corresponds to the light-exit pattern 78.

The backlight module 50 may have, as shown in FIG. 5, a plurality of key group areas 52, 54, 56. In some embodiments, referring to the key group area 52 in FIG. 6A, corresponding to the backlight module 50, the light guide film 70 has a light-blocking band 778c around the key group area 52. The light-blocking band 778c corresponds to the shading ring 771. The light source assembly 60 includes a circuit board (which may consist of a substrate 64, a circuit layer 66, and a reflective 68 shown in FIG. 4B). The light-emitting component 62 is located on the circuit board. The backlight module 50 further includes a light-blocking ring (similar to the light-blocking ring 779 shown in FIG. 7A). The light-blocking ring 779 is located between the circuit board and the light guide film 70 and corresponds to the light-blocking band 778c.

On the other hand, refer to FIG. 4A and FIG. 4B. According to some embodiments, a backlight module 50 includes a light source assembly 60, a light guide film 70 and a reflective sheet 75. The light source assembly 60 includes a light-emitting component 62. The light-emitting component 62 is configured to emit light. The light guide film 70 has a bottom surface 72b, a through hole 74 and a light-exit pattern 78. A size of the through hole 74 is smaller than a size of the light-emitting component 62. The light of the light-emitting component 62 is propagated toward the through hole 74. The light-exit pattern 78 is located on the bottom surface 72b. The reflective sheet 75 is located above the through hole 74. A size of the reflective sheet 75 is larger than or equal to the size of the through hole 74. In some embodiments, a distance from the through hole 74 to the outer edge of the light-exit pattern 78 is greater than a distance from the through hole 74 to the outer edge of the reflective sheet 75 (for example, viewed from a top view as shown in FIG. 4A). However, a distance from the through hole 74 to the inner edge of the light-exit pattern 78 is less than a distance from the through hole 74 to the outer edge of the reflective sheet 75 (differing from the embodiment shown in FIG. 4A). In this way, some of the light directed upward by the light-exit pattern 78 is reflected by the reflective sheet 75 and continues to be transmitted inside the light guide film 70. In some embodiments, a distance from the through hole 74 to the inner edge of the light-exit pattern 78 is greater than a distance from the through hole 74 to the outer edge of the reflective sheet 75 (similar to the embodiment shown in FIG. 4A). In this way, almost all of the light directed upward by the light-exit pattern 78 is not reflected by the reflective sheet 75, and can be emitted to the keycap 12 above. In other words, the luminance of a particular keycap 12 on the keyboard assembly 10 can be finely adjusted according to the size of the corresponding reflective sheet 75 below the keycap 12.

In conclusion, according to some embodiments, in the backlight module 50, the through hole 74 with a relative small size on the light guide film 70 cooperates with the light-incident pattern 76 or the reflective sheet 75, so that the light emitted by the light-emitting component 62 can be directed to the keycaps 12 more efficiently, to illuminate the keycaps 12 with higher luminance for a user to see the keycaps 12.

What is claimed is:

1. An illuminated keyboard, comprising:
   a keyboard assembly; and
   a backlight module, located below the keyboard assembly, wherein the backlight module comprises:
   a light source assembly, comprising a light-emitting component, wherein the light-emitting component includes an LED and a lens; and a light guide film, having a top surface, a bottom surface, a through hole, a light-incident pattern and a light-exit pattern, wherein the light-emitting component is correspondingly located below the through hole, a size of an opening area of the through hole is smaller than a size of an extension area except the height of the light-emitting component, the light of the light-emitting component is emitted upward toward the through hole, the light-incident pattern is on at least one of the top surface and the bottom surface and is adjacent to the through hole, the light-exit pattern is on the bottom surface, and a distance from the through hole to the light-exit pattern is greater than a distance from the through hole to the light-incident pattern;

wherein the light-incident pattern encloses the through hole, and the light-exit pattern encloses the through hole.

2. The illuminated keyboard according to claim 1, wherein the backlight module further comprises a reflective sheet, and the reflective sheet is between the light guide film and the keyboard assembly and corresponds to the through hole.

3. The illuminated keyboard according to claim 1, wherein the light-incident pattern is adjacent to the through hole and on both the top surface and the bottom surface.

4. The illuminated keyboard according to claim 1, wherein the keyboard assembly comprises a plurality of keycaps, a central axis of the through hole is toward one of the plurality of keycaps, the light-exit pattern is located near the edge of the keycap, the backlight module further comprises a shading ring, the shading ring is between the light guide film and the keyboard assembly, the shading ring has an opening, and the opening corresponds to the light-exit pattern.

5. The illuminated keyboard according to claim 1, wherein the keyboard assembly comprises a plurality of keycaps, a central axis of the through hole is toward a position between two adjacent keycaps of the plurality of keycaps, the light guide film has two light-exit patterns, the two light-exit patterns correspond to the two adjacent keycaps respectively, the backlight module further comprises a shading ring, the shading ring is between the light guide film and the keyboard assembly, the shading ring has two openings, and the two openings correspond to the two light-exit patterns respectively.

6. The illuminated keyboard according to claim 1, wherein the keyboard assembly comprises a plurality of keycaps, a central axis of the through hole is toward a position among three adjacent keycaps of the plurality of keycaps, the light guide film has three light-exit patterns, the three light-exit patterns correspond to the three adjacent keycaps respectively, the backlight module further comprises a shading ring, the shading ring is between the light guide film and the keyboard assembly, the shading ring has three openings, and the three openings correspond to the three light-exit pattern respectively.

7. The illuminated keyboard according to claim 6, wherein the light guide film further has a light-blocking band, and the light-blocking band surrounds the three adjacent keycaps.

8. The illuminated keyboard according to claim 7, wherein the light source assembly further comprises a circuit board, the light-emitting component is on the circuit board, the backlight module further comprises a light-blocking ring, and the light-blocking ring is between the circuit board and the light guide film and corresponds to the light-blocking band.

9. The illuminated keyboard according to claim 6, wherein the through hole has three light-collecting corners, and the light-collecting corners correspond to the three light-exit patterns respectively.

10. The illuminated keyboard according to claim 1, wherein the light source assembly comprises a plurality of light-emitting components, and at least two of the light-emitting components emit light of different colors.

* * * * *